United States Patent
Chaudhuri et al.

(10) Patent No.: US 9,052,955 B2
(45) Date of Patent: Jun. 9, 2015

(54) SYSTEM AND METHOD FOR SEAMLESS APPLICATION HOSTING AND MIGRATION IN A NETWORK ENVIRONMENT

(75) Inventors: Sragdhara Datta Chaudhuri, Karnataka (IN); Karthikeyan Ramachandran, Karnataka (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 320 days.

(21) Appl. No.: 13/557,992

(22) Filed: Jul. 25, 2012

(65) Prior Publication Data

US 2014/0032785 A1  Jan. 30, 2014

(51) Int. Cl.
G06F 9/50 (2006.01)
G06F 17/30 (2006.01)
H04L 29/12 (2006.01)
H04N 21/858 (2011.01)

(52) U.S. Cl.
CPC ............ *G06F 9/5027* (2013.01); *H04N 21/858* (2013.01); *G06F 17/30861* (2013.01); *H04L 61/00* (2013.01)

(58) Field of Classification Search
CPC ................... G06F 17/30876; G06F 9/5027
USPC .......................................... 709/245; 707/781
See application file for complete search history.

(56) References Cited

U.S. PATENT DOCUMENTS

| | | | |
|---|---|---|---|
| 5,774,660 A * | 6/1998 | Brendel et al. ................ 709/201 |
| 7,260,224 B1 * | 8/2007 | Ingle et al. .................... 380/279 |
| 7,328,260 B1 * | 2/2008 | Muthiyan et al. ............. 709/224 |
| 7,487,539 B2 | 2/2009 | Ramachandran et al. |
| 8,024,441 B2 * | 9/2011 | Kommula et al. ............ 709/223 |
| 2002/0188606 A1 * | 12/2002 | Sun et al. ........................ 707/10 |
| 2003/0093400 A1 * | 5/2003 | Santosuosso ..................... 707/1 |
| 2003/0208472 A1 * | 11/2003 | Pham ................................ 707/2 |
| 2004/0054671 A1 * | 3/2004 | Cohen et al. ..................... 707/3 |
| 2005/0091344 A1 * | 4/2005 | Chen et al. .................... 709/219 |
| 2009/0234970 A1 * | 9/2009 | Sun ............................... 709/245 |
| 2010/0114823 A1 * | 5/2010 | Sykes et al. ................... 707/626 |
| 2010/0131484 A1 * | 5/2010 | Gosse et al. .................. 707/706 |
| 2010/0153558 A1 * | 6/2010 | Kommula ..................... 709/226 |
| 2010/0241762 A1 * | 9/2010 | Deutsch et al. ............... 709/245 |
| 2010/0250757 A1 | 9/2010 | Akhter et al. |
| 2011/0035437 A1 * | 2/2011 | Toumura ....................... 709/203 |
| 2011/0082920 A1 * | 4/2011 | Bhattacharya et al. ....... 709/221 |
| 2011/0219120 A1 | 9/2011 | Farber et al. |

OTHER PUBLICATIONS

Coyote Point, "Creating HTTP-to-HTTPS Redirects with Match Rules and Responders", 2009.*
Fielding et al., "Hypertext Transfer Protocol—HTTP/1.1", RFC 2616, 1999.*

* cited by examiner

*Primary Examiner* — O. C. Vostal
(74) *Attorney, Agent, or Firm* — Patent Capital Group

(57) ABSTRACT

An example method includes receiving a hypertext transfer protocol (HTTP) request from a client for an application at a first datacenter at which the application is not available; and querying a first global site selector (GSS) configured to identify a second datacenter at which the application is available. The second datacenter can be identified by a selected virtual Internet Protocol (VIP) address. The method can also include forwarding the HTTP request to the selected VIP address; and responding to the client with an HTTP response received from the selected VIP address.

20 Claims, 5 Drawing Sheets

SYSTEM AND METHOD FOR SEAMLESS APPLICATION HOSTING AND MIGRATION IN A NETWORK ENVIRONMENT

TECHNICAL FIELD

This disclosure relates in general to the field of communications and, more particularly, to a system and a method for seamless application hosting and migration in a network environment.

BACKGROUND

Cloud computing can facilitate organizing computing resources into multiple datacenters, each datacenter offering a pool of configurable computing resources and storage and physically separated from the other datacenters. Such multi-datacenter architectures can offer data distribution services with high availability, among other features. These datacenters, and other such service provider or enterprise deployment architecture where a single domain name is hosted across multiple datacenters can also offer geographic proximity, which can result in low latency, and thereby, provide better fault migration and load sharing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method is provided and includes receiving a hypertext transfer protocol (HTTP) request from a client for an application at a first datacenter at which the application is not available; and querying a first global site selector (GSS) configured to identify a second datacenter at which the application is available. The second datacenter can be identified by a selected virtual Internet Protocol (VIP) address. The method can also include forwarding (i.e., communicate in any way) the HTTP request to the selected VIP address; and responding to the client with an HTTP response received from the selected VIP address.

In example embodiments, the first GSS can identify the second datacenter from a VIP uniform resource locator (URL) configuration {VIP, URL} that includes the selected VIP address corresponding to a URL of the application. In example embodiments, the method may further include configuring the application on an application control engine (ACE) in the second datacenter, and pushing the URL-VIP pair to a second GSS in the second datacenter. The second GSS may propagate the URL and the selected VIP address to the first GSS. The URL of the application may be added to a URL match policy in the ACE. In some embodiments, the URL of the application may be added to the URL match policy when the application is added to the second datacenter, and other features.

Example Embodiments

Figure 1:
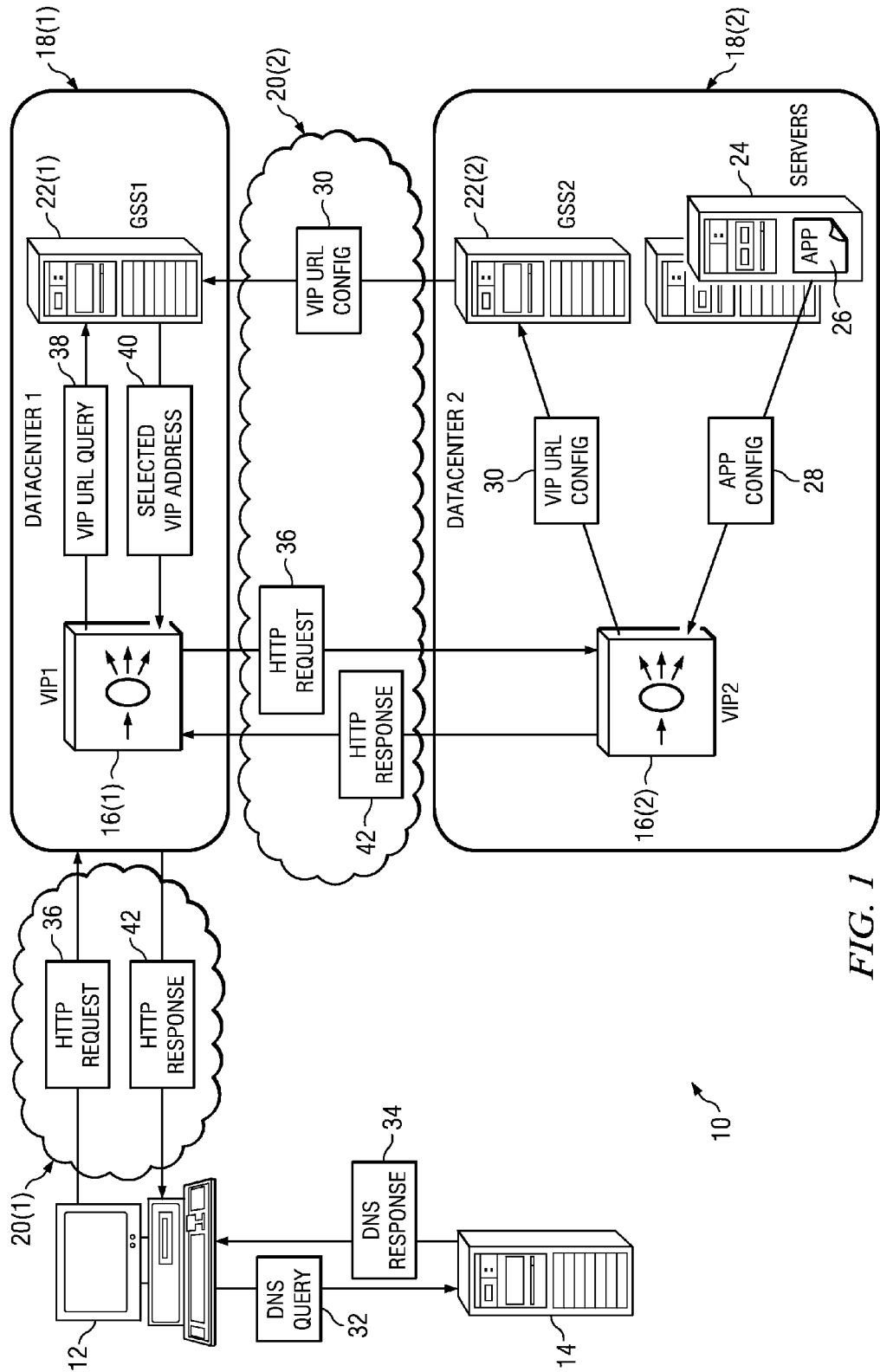
FIG. 1 is a simplified block diagram illustrating a communication system for seamless application hosting and migration in a network environment in accordance with one example embodiment of the present disclosure.

Turning to FIG. 1, FIG. 1 is a simplified block diagram illustrating a communication system 10 for seamless application hosting and migration in a network environment in accordance with one example embodiment. FIG. 1 illustrates a client 12 that can communicate with a domain name system (DNS) server 14. A Domain Name Service running in DNS server 14 may translate queries for domain names (e.g., www.company.com) into Internet Protocol (IP) addresses. Client 12 can communicate with an application control engine (ACE) 16(1) having a virtual IP (VIP) address VIP1 in a datacenter 18(1) ("datacenter 1") over a network (e.g., Internet) 20(1). Datacenter 18(1) may communicate with another datacenter 18(2) ("datacenter 2") over another network (e.g., wide area network (WAN)) 20(2). Datacenter 18(2) may include another ACE 16(2) that can communicate with ACE 16(1). Datacenters 18(1) and 18(2) may include respective global site selectors (GSSs) 22(1) and 22(2). Datacenter 18(2) may include servers 24 that host an application 26.

According to embodiments of communication system 10, ACEs 16(1) and 16(2) may be configured to receive hypertext transfer protocol (HTTP) requests destined to VIP addresses configured locally and to match the request using URL match policies to balance load among servers in respective datacenters 18(1) and 18(2). GSS 22(1) and 22(2) may allow deployment of Internet and intranet applications (e.g., application 26) such that application users (e.g., client 12) may be quickly routed to a standby datacenter (e.g., datacenter 18(2)) if a primary datacenter (e.g., datacenter 18(1)) is down. GSS 22(1) and 22(2) can perform global traffic management and loadbalancing of the applications according to suitable business rules. GSS 22(1) and 22(2) may also act as authoritative name servers, performing DNS resolution based on client 12's DNS request for a specific domain name (e.g., www-.company.com) and choosing a suitable datacenter 18(1) or 18(2) (e.g., amongst multiple datacenters hosting the domain name) to respond to client 12's DNS request.

Certain terminologies are used with regard to the various embodiments of communication system 10. The term "client" may be inclusive of devices used to initiate a communication, and programs that seek to initiate a communication on behalf of another entity or element, and can include computers, personal digital assistants (PDAs), laptops, electronic notebooks, cellular telephones, tablets, iPads, databases, or any other component, device, element, application, or object capable of initiating a voice, audio, video, or data exchanges within communication system 10. As used herein, the term "datacenter" may include a network of hardware and software forming a shared pool of configurable computing resources (e.g., networks, servers, storage, applications, services, etc.) that can be suitably provisioned to provide on-demand selfservice, network access, resource pooling, elasticity and measured service, among other features.

As used herein, the term "application" may be inclusive of any type of numeric, voice, video, or script data, or any type of source or object code, or program files, software, executable file comprising instructions that can be understood and processed on a computer, library modules loaded during execution, object files, system files, hardware logic, software logic, or any other executable modules or other suitable information in any appropriate format that may be communicated from one point to another in electronic devices and/or networks.

As used herein, the term "network element" can include computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

The term "HTTP request" may be inclusive of a request message in HTTP or equivalent client-server protocols, such as HTTP secure (HTTPS), secure HTTP (S-HTTP), HTTP/1.1 Upgrade header, Representational state transfer (REST), SPDY, Waka, etc. The HTTP (and equivalent) protocol is a client-server protocol, where the client submits the HTTP request message to the server. The HTTP request can contain the following: a request line, for example GET /app1.html HTTP/1.1, HOST: www.company.com, which requests a resource called app1.html from server located at www.company.com; headers, such as accept-language: en; an empty line; and an optional message body. In a general sense, the HTTP request can contain a URL of requested resource.

The server, which provides resources such as hypertext markup language (HTML) files and other content, or performs other functions on behalf of the client, returns a response message, called herein as an "HTTP response," to the client. The HTTP response can contain completion status information about the request and may also contain requested content in its message body, including the following: a status-line (for example HTTP/1.1 200 OK, which indicates that the client's request succeeded; headers, such as content-type: text/html; an empty line; and an optional message body.

"URL" is a specific character string that constitutes a reference to a network resource. In general, the URL comprises the following: the protocol (e.g., http, https, gopher, etc.), followed by a colon, two slashes, then, depending on the protocol, a server name (exp, ftp, www, smtp, etc.) followed by a dot (.) then a domain name (alternatively, IP address), and the path of the resource to be fetched or the program to be run. An example of a URL is http://www.company.com/app1.html, which indicates the HTTP protocol, the server www, located at the domain name company.com, with the path indicated by app1.html, to the resource identified as app1.html. The domain name (or IP address) gives the destination location for the URL; and the path is used to specify and find the resource requested. The domain name (e.g., company.com) is an identification string that defines an IP address in a network.

For purposes of illustrating the techniques of communication system 10, it is important to understand the communications that may be traversing the system shown in FIG. 1. The following foundational information may be viewed as a basis from which the present disclosure may be properly explained.

Such information is offered earnestly for purposes of explanation only and, accordingly, should not be construed in any way to limit the broad scope of the present disclosure and its potential applications.

Large multi-datacenter deployments are on the rise, as also web-based enterprise applications with cloud based application hosting. For multiple, geographically distributed datacenters, the domain name (e.g. company.com) can be resolved to the IP address of any one of the datacenters; however, each datacenter may serve a different set of applications under the same domain name. Such asymmetric application distribution over a set of datacenters may be implemented for various reasons: different datacenter capacities, capabilities, service level agreements, etc. may lead to different applications being hosted at different datacenters; application migration between datacenters can result in temporary asymmetric application distribution; application redundancy and fail over between multiple distributed datacenters may lead to multiple datacenters hosting the same applications, although only one datacenter has the application active and accessible by users.

Server load balancing devices, such as the ACE that are connected to a corporate LAN or the Internet, can balance content requests among two or more servers. Server loadbalancing devices ensure that the content consumer is directed to the host that is best suited to handle that consumer's request. GSS typically performs loadbalancing across multiple geographically dispersed datacenters. GSS leverages global content deployment across multiple distributed and mirrored data locations, optimizing site selection, improving DNS responsiveness, and ensuring datacenter availability. The GSS is generally inserted into the traditional DNS routing hierarchy and monitors the health and load of the ACEs in individual datacenters. The GSS uses the ACE supplied information and user-specified routing algorithms to select a suitable (e.g., least-loaded) datacenter in real time. The GSS can detect site outages, ensuring that web-based applications are online and that customer requests to datacenters that suddenly go offline are quickly rerouted to available resources. GSS can also play the role of an authoritative DNS server for specific domain names hosted by certain organizations across the datacenters they own.

DNS is a hierarchical distributed naming system for any resource (e.g., computer, network service, etc.) in a network. DNS associates information such as IP addresses with corresponding domain names (e.g., company.com) in the network. Some of the components in the DNS infrastructure include DNS resolvers (e.g., clients that access DNS servers); DNS servers (e.g., server running DNS software that has the responsibility of finding the requested web site); root name servers (e.g., server residing at the top of the DNS hierarchy, and that can resolve the top level domains, such as .com, .net, etc.); intermediate name servers (e.g., server used for scaling purposes, delegated from the root name server); authoritative name servers (e.g., server that responds directly to the DNS server with the requested IP address). Information about the domain name space is stored on DNS servers that are distributed throughout the Internet. Each DNS server stores the complete information about its small part of the total domain name space. This space is referred to as a DNS zone. A zone file containing DNS information for each domain (e.g., "company.com") or subdomain (e.g., "abc.company.com") in the DNS zone is stored in the DNS server.

End users needing data from a particular domain (e.g., company.com) generate a recursive DNS request on their client that is sent first to the local DNS server. The DNS server returns the IP address of the requested domain to the end user.

If the local DNS server does not have the information requested by the end user, it sends a query to a root name server asking for the IP address. The root name server responds to the request by either: referring the DNS server to the specific name server supporting the top-level domain; or sending the DNS server to an intermediate name server that knows the address of the authoritative name server for the requested domain name.

The local DNS server sends a query to the intermediate name server that responds by referring the DNS server to the authoritative name server for the requested domain name and all the associated subdomains. The local DNS server sends a query to the authoritative name server for the requested domain name. The authoritative name server responds to the DNS server with an appropriate IP address (e.g., 172.16.56.76). The DNS server sends the IP address to the client. The client uses the IP address to initiate a connection to a website at the requested domain name. Note that the DNS protocol cannot resolve the part of URLs that indicates the path such as the part after the domain name in www.company.com/app1.html (i.e., /app1.html), as the path is not a domain name or a subdomain name. Thus, a DNS query app1.html hosted at www.company.com can be resolved only up to www.company.com.

The GSS supports several (e.g., over 4000) separate VIP addresses. It coordinates the activities of ACEs by acting as the authoritative DNS server for the devices (e.g., servers) under its control. The name space records in local DNS servers point to the GSSs located at the nearest datacenter. The GSS determines which datacenter site should receive the client traffic. As the authoritative name server for a domain or subdomain, the GSS considers several factors when responding to a DNS request, such as availability (e.g., servers that are online and available to respond to the query); proximity (e.g., server that responded the fastest to a query); load (e.g., type of traffic load handled by servers in the domain); source of the request (e.g., DNS server requesting the content); and preference (e.g., first, second, or third choice of the loadbalancing algorithm to use when responding to a query), among other factors (e.g., country specific policies).

When resolving DNS requests, the GSS performs a series of distinct operations that take into account the resources under its control and return a suitable VIP to the DNS server. For example, an end user types in www.company.com in an address field of the client (e.g., browser) in order to download an updated version of an application from the website at www.company.com. The domain name may be hosted at three different datacenters. The DNS server processes the request and the request arrives at the GSS in one of the datacenters hosting the domain name. The GSS sends to the client the IP address of the suitable ACE, for example, at datacenter 2. The client processes the transmitted IP address and is directed to the ACE at datacenter 2.

In addition to specifying a resource, GSS can also be configured with an option of specifying a keepalive for a resource in the datacenter. GSS periodically checks to determine if a resource is still active using a keepalive protocol (e.g., Keep Alive Appliance Protocol (KAL-AP)), which is a specific interaction (e.g., handshake) between the GSS and another device. A keepalive is designed to test if a specific protocol on the device is functioning properly. If the handshake is successful, then the device is available, active, and able to receive traffic. If the handshake fails, then the device is considered to be unavailable and inactive. The GSS uses keepalives to collect and track information from the online status of VIP addresses to services and applications running on a server.

GSS devices respond to DNS queries and perform keepalives to provide global server loadbalancing functionality. Additionally, a designated GSS may act as a central management device and host an embedded GSS data store (e.g., database) that contains shared configuration information, such as DNS rules, and individual device configuration for each GSS that it controls. Configuration changes may be made to the designated GSS and the changes are automatically communicated to each registered GSS. The GSS performs routing of DNS queries based on the DNS rules and conditions created from the designated GSS. Each GSS is known to and synchronized with the designated GSS. Synchronization occurs automatically between the two devices whenever the GSS network configuration changes. Updates are packaged and sent to the designated GSS using a secure connection between the two devices.

Within a single datacenter, an ACE typically distributes load across a group of servers in a server farm and represents the group (or datacenter) by a VIP address. Thus, each datacenter may be identified by a corresponding VIP address for a specific domain name—each VIP address acts as the publicly addressable front end of the datacenter for that specific domain name. Behind each ACE are transaction servers, database servers, and mirrored origin servers (among other compute, storage, and network resources) offering a wide variety of content (e.g., websites, applications). The GSS communicates directly with the ACEs representing each datacenter by collecting statistics on availability and load for each ACE and VIP.

Each application in the datacenter may have a distinct URL (e.g. www.company.com/app1.html, www.company.com/app2.html), albeit with the same domain name (e.g., company.com). Generally, resolution of DNS queries is performed only on the domain name, without distinguishing between the paths of the different applications. The GSS may reply to an incoming client request for DNS resolution with the suitable VIP at that point of time for the client for that domain name. The client may subsequently establish connection with the VIP in the DNS reply, but the VIP may represent a datacenter that may not be hosting the requested application. The ACE may send an HTTP redirect back to the client, informing the client of the correct VIP. The client can then send another request to the correct VIP. For example, an HTTP request from the client may hit the ACE with URL http://www.company.com/app1.html. The ACE may send an HTTP redirect message back asking the requestor to connect to URL http://www-app1.company.com. The requestor may subsequently perform a DNS resolution for the redirect URL and reach another datacenter where the application is supported on server app1. However, due to branding and security related issues, redirecting the HTTP request may not be an acceptable solution in certain deployments.

An alternative mechanism may be to forward the HTTP request from the datacenter that received the request to another datacenter that can serve the request. The ACE may select the other datacenter after a determination about the appropriate datacenter that can serve the request. Thus, VIP addresses hosted in other datacenters may have to be configured on the ACE as real servers. Moreover, each ACE in each datacenter may have to be configured with all locally non-supported applications (e.g., identified by URL match criteria) and associated remote VIPs in other datacenters where that application is supported. The ACE may also monitor the health of the application in substantially all the other datacenters and select a suitable datacenter that can serve the HTTP request. Such configuration can lead to excessive overhead on the ACEs, especially where numerous applications are hosted asymmetrically in myriad datacenters. When a new application is added in one of the datacenters, the configuration change may have to be replicated in substantially all ACEs in the system.

Yet another mechanism may be to connect all datacenters in a ring and then if any one ACE cannot serve a request locally, it can simply forward the request to the next datacenter. However, such an approach can result in suboptimal choice and the request-response path could become multiple hops with several nodes in the request-response path.

Communication system 10 is configured to address these issues (and others) in offering a system and method for seamless application hosting and migration in a network environment. Embodiments of communication system 10 include mechanisms for forwarding an HTTP request 36 to suitable datacenters (e.g., datacenter 18(2)) when the request cannot be served locally (e.g., at datacenter 18(1)). During operation, elements of communication system 10 may implement three distinct flows: (1) configuration flow; (2) monitor flow; and (3) data flow.

In the configuration flow, ACE 16(2) may be configured with an application configuration ("App Config") 28, specifying the appropriate URL (e.g., www.company.com/app1.html) and the specific servers 24 where application 26 is available. App config 28 may be included in a URL match policy within ACE 16(2). In one embodiment, the user (e.g., network administrator) may include App Config 28 manually (or semi-manually) in ACE 16(2)'s URL match policy. In another embodiment, when application 26 is installed on servers 24, application 26 may push App Config 28 to ACE 16(2). ACE 16(2) may subsequently include App Config 28 in its URL match policy. ACE 16(2) may respond to HTTP request 36 for application 26, based on information from App Config 28 in its URL match policy. The URL (e.g., http://www.company.com/app1.html) of application 26 may be indicated in HTTP request 36.

According to various embodiments, ACE 16(2) may push information from App Config 28 to GSS 22(2) in a VIP URL Configuration ("VIP URL Config") 30, which includes the specific VIP (e.g., VIP2) and URL associated with application 26 at the specific domain name. VIP URL Config 30 can indicate the specific datacenter represented by the VIP (e.g., VIP2) at which application 26 (identified by its URL www.company.com/app1.html) may be served. VIP URL Config 30 may be in any suitable format, based on particular network needs. For example, VIP URL Config 30 may be communicated using Remote Procedure Call (RPC), DNS request, an extension of KAL-AP messages, or such other message exchange mechanisms. GSS 22(2) may propagate VIP URL Config 30 to GSS 22(1) (and other GSSs in a cluster of the domain), for example, using RPC. Thus, GSS 22(2) and GSS 22(1) may synchronize the application configuration information and store the information at respective local storage devices (e.g., databases), based on particular needs.

In the monitor flow, application 26 may be monitored for various parameters. For example, a health of application 26 may be monitored, to determine the status of the server it is available on, whether or not content being returned by the server is correct and should be delivered to client 12, the status of application 26, and other parameters. In another example, the configuration of application 26 may be monitored, to determine any changes to its location (e.g., such as moving from one datacenter to another), or other configuration parameters. Any changes in application 26 determined from the monitoring may be propagated to GSS 22(1) and 22(2) through the synchronization mechanism.

The KAL-AP mechanism used between GSS 22(2) and ACE 16(2) for load monitoring may be enhanced to include load factors per application, which may be an improvement from current mechanisms where loadbalancing considers the number of servers, but may not consider the actual load on the server at the application level. In specific embodiments, KAL-AP may be improved with application aware features. In embodiments of communication system 10, an application specific load can be obtained using KAL-AP-by-tag instead of KAL-AP-by-VIP (e.g., since the same VIP may support multiple applications) to map a tag to application 26 and also to account for actual load on real servers 24. The information used by KAL-AP-by-tag features may be available from local probing by ACE 16(2) to real servers 24.

In the data flow, an end user at client 12 may want to load application 26 from a specific URL (e.g., www.company.com/app1.html). Because the application URL cannot be resolved down to the application location (as the DNS protocol only permits resolution up to the domain name level, and does not include the path), client 12 may send a DNS query 32 to DNS server 14 for the specific domain name (www.company.com), rather than the entire URL. DNS server 14 may query GSS 22(1), which may be the nearest authoritative name server for the domain. GSS 22(1) may determine that VIP1 is suitable for DNS server 14, and provide VIP1 to DNS server 14. DNS server 14 may send a DNS response 34, including VIP1 to client 12. Client 12 may send an HTTP request 36 for application 26 (e.g., www.company.com/app1.html) to VIP1, at which ACE 16(1) is located.

In various embodiments, ACE 16(1) may look up its URL match policy to determine whether requested application 26 is available at datacenter 18(1). ACE 16(1) may determine that datacenter 18(1) does not host application 26. When the determination indicates that application 26 is not available at datacenter 18(1), the request may reach a default handler in ACE 16(1). The default handler may query local GSS 22(1) with a VIP URL query 38. VIP URL query 38 may provide the requested URL (e.g., www.company.com/app1.html) and other parameters (e.g., IP address of client 12) and inquire about a matching VIP associated with the URL. GSS 22(1) may respond with a selected VIP address 40. Selected VIP address 40 may specify VIP2, at which ACE 16(2) is located, based on VIP URL Config 30, propagated to GSS 22(2) by GSS 22(1). Subsequently, ACE 16(1) may forward HTTP request 36 to ACE 16(2). ACE 16(2) may respond appropriately with an HTTP response 42, based on App Config 28 in its URL match policy. ACE 16(1) may forward HTTP response 42 to client 12.

In various embodiments, ACEs (e.g., ACEs 16(1) and 16(2)) may be configured with URLs and associated VIP addresses of applications (e.g., application 26) available in respective datacenters (e.g., datacenters 18(1) and 18(2)). For URL forwarding to a datacenter that hosts a requested application (e.g., application 26), instead of having all the applications and their associated VIP addresses in various datacenters configured on each ACE in each datacenter, it may be sufficient to configure only the specific ACE (e.g., ACE 16(2)) in the datacenter (e.g., datacenter 18(2)) that supports the application (e.g., application 26). The ACE (e.g., ACE 16(2)) may communicate the configuration to its local GSS (e.g., GSS 22(2)) and make use of the GSS cluster to propagate the configuration to all GSSs in the cluster across multiple datacenters. Embodiments of communication system 10 can also be used when applications are symmetrically distributed across datacenters to support failover cases. If an application is configured on ACE 16(1) in datacenter 18(1), and an incoming request matches the URL, but the server (or the application) is down at that point, ACE 16(1) can be configured to query local GSS 22(1) to get an alternative VIP from the other datacenters.

According to various embodiments, a suitable VIP for forwarding HTTP request 36 may be chosen, while avoiding the health monitoring of the datacenters associated with each of ACEs 16(1) and 16(2). In some embodiments, GSS 22(1) and 22(2) can choose a suitable VIP (e.g., VIP2) as selected VIP address 40 based on their awareness of the specific VIP addresses that each hosted application maps to, and the load on each VIP. In such embodiments, ACEs 16(1) and 16(2) need not be aware of locations where available applications are supported in the domain. Additionally, existing health monitoring schemes, such as KAL-AP may be used to report VIP and real server availability. The processing of HTTP request 36 may be transparent to client 12. For example, client 12 may send HTTP request 36 to ACE 16(1) at VIP1, and receive HTTP response 42 from ACE 16(1) at VIP1. Client 12 may not communicate with ACE 16(2) throughout the session, and may not be aware that HTTP request 36 is being served at a different VIP (e.g., VIP2) than VIP1.

If application 26 is supported on multiple datacenters with corresponding distinct VIP addresses (e.g., VIP3, VIP4, VIP5, etc.), GSS 22(1) may select a specific VIP as selected VIP address 40 based on at least load distribution among substantially all GSSs in the plurality of datacenters, geographical proximity of each datacenter to client 12 and/or intelligent policies. For example, GSS 22(1) may perform a VIP address selection based on load since GSS 22(1) already monitors and maintains load of all VIP addresses under the domain name company.com using the KAL-AP mechanism (or other mechanisms such as SNMP probing, simple ping, etc.) GSS 22(1) may also support VIP address selection based on geographical proximity (e.g., GSS 22(1) may have a GeoDB database). GSS 22(1) can even select a datacenter that is closest to datacenter 18(1) where HTTP request 36 was first received.

Turning to the infrastructure of communication system 10, the network topology can include any number of servers, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified considerably for ease of illustration.

The example network environment, including networks 20(1) and 20(2) may be configured over a physical infrastructure that may include one or more networks and, further, may be configured in any form including, but not limited to, local area networks (LANs), wireless local area networks (WLANs), VLANs, metropolitan area networks (MANs), WANs, virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In some embodiments, datacenters 18(1) and 18(2) may be physically geographically separated from each other (e.g., datacenter 18(1) located in California and datacenter 18(2) located in North Carolina). In other embodiments, datacenters 18(1) and 18(2) may be physically separated by network elements (e.g., datacenter 18(1) separated from datacenter 18(2) with one or more firewalls that control communication between the two networks) although they may be located in close proximity (e.g., within the same building). In yet other embodiments, datacenters 18(1) and 18(2) may be logically separated by virtual network elements in a common physical infrastructure (e.g., datacenters 18(1) and 18(2) may comprise two distinct distributed virtual switches controlling distinct virtual machines).

ACEs 16(1) and 16(2) are server loadbalancers (SLBs) or other such network elements, at which VIP addresses, uniform resource locator (URL) match policies, and servers are configured (among other features). GSS 22(1) and 22(2) are multi-datacenter SLBs or other such network elements configured to choose a server (or SLB) from several servers (or SLBs) in a multi-datacenter network environment. ACEs 16(1) and 16(2), and GSS 22(1) and 22(2) may be hardware SLBs, or software SLBs. In various embodiments, ACEs 16(1) and 16(2) and GSS 22(1) and 22(2) may be collocated with (or coupled to) a server. In other embodiments, they may each be a separate independent network element.

Embodiments of communication system 10 can avoid use of URL redirect, and configuration of multiple ACEs in various datacenters for each application. Embodiments can also avoid health monitoring of other datacenters from an ACE in one datacenter, as GSS can monitor VIP addresses of all datacenters. Moreover, features like KAL-AP can be improved, with better application aware features.

Figure 2:
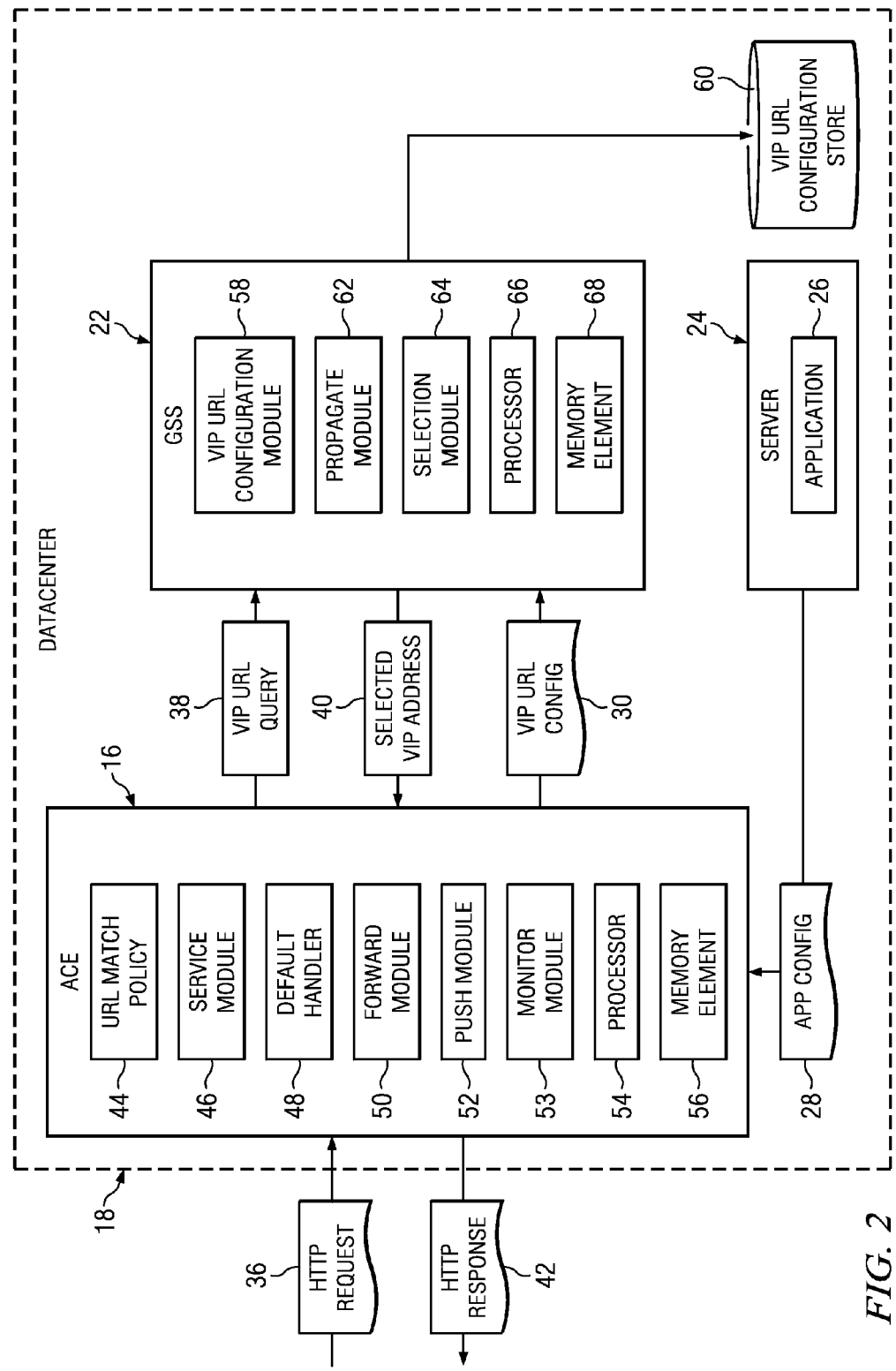
FIG. 2 is a simplified block diagram illustrating example details of the communication system in accordance with one embodiment.

Turning to FIG. 2, FIG. 2 is a simplified block diagram illustrating example details of an embodiment of communication system 10. Representative ACE 16 in representative datacenter 18 may include a URL match policy 44, a service module 46, a default handler 48, a forward module 50, a push module 52, a monitor module 53, a processor 54, and a memory element 56. Representative GSS 22 may include a VIP URL Configuration module 58, a VIP URL Configuration store 60, a propagate module 62, a selection module 64, a processor 66 and a memory element 68.

HTTP request 36 for application 26 may specify the URL for application 26, including a domain name and a path (e.g., www.company.com/app1.html). ACE 16 may lookup URL matching policy 44 to determine if it can serve HTTP request 36. If HTTP request 36 can be served (e.g., application 26 is available in datacenter 18), service module 46 may find appropriate application server 24 in datacenter 18 that hosts application 26, and forward HTTP request 36 to the appropriate server 24. When server 24 responds with HTTP response 42, HTTP response 42 may be relayed back to client 12.

The URL of application 26 may be included in URL match policy 44 through App Config 28. In various embodiments, App Config 28 may include the URL and corresponding server(s) where application 26 is located. In one embodiment, when application 26 is installed in datacenter 18, App Config 28 may be included in URL match policy 44. When application 26 is removed from the datacenter, the URL may be removed from URL match policy 44.

Push module 52 may push information from App Config 28 to GSS 22 in VIP URL Config 30. VIP URL Config 30 may include the VIP address of ACE 16, and the URL of application 26. In specific embodiments, VIP URL Config 30 may include a URL match condition configured on ACE 16 (e.g., represented as a regular expression match). In some embodiments, URLs of substantially all applications supported by ACE 16 may be included in VIP URL Config 30. In other embodiments, each application supported by ACE 16 may correspond to a different VIP URL Config 30. VIP URL Config 30 may be in any suitable format, based on particular needs of communication system 10. In some embodiments, VIP URL Config 30 may be periodically pushed to GSS 22. In other embodiments, VIP URL Config 30 may be pushed to GSS 22 only when there is a change in URL match policy 44 (e.g., application added or removed). Monitor module 53 may monitor application 26, and push any change to GSS 22 via VIP URL Config 30. In some embodiments, monitor module 53 may use KAL-AP (or other such mechanisms, such as remote procedure call) for communicating VIP URL Config 30.

VIP URL Configuration module 58 may receive VIP URL Config 30 and store it in VIP URL Configuration store 60. VIP URL Configuration store 60 may be any suitable database, storage device, or other network element that is configured to store and retrieve information. In some embodiments, VIP URL Configuration store 60 may be located at a single GSS (e.g., designated GSS that manages the other GSS in the cluster) in a remote datacenter, and accessible by GSS 22. In other embodiments, each GSS in the cluster may maintain VIP URL Configuration store 60 in respective datacenters. VIP URL Configuration store 60 may store information in VIP URL Config 30 in any suitable format.

Propagate module 62 may propagate VIP URL Config 30 to various remote GSS in communication system 10. In some embodiments, the propagation may be implemented as part of the synchronization mechanism between the various GSS. In other embodiments, the propagation may be implemented as a separate process. GSS 22 may store VIP URL Config 30 received via propagation from other GSS in VIP URL Configuration store 60. Thus, VIP URL Configuration store 60 may include a list of VIP addresses and corresponding application URLs supported at the VIP addresses across multiple datacenters.

Referring back to HTTP request 36, if the requested application in HTTP request 36 is not available at datacenter 18, HTTP request 36 may be transferred to default handler 48. Default handler 48 may send VIP URL query 38 to GSS 22. VIP URL query 38 may query GSS 22 for a suitable VIP address that can satisfy HTTP request 36. Selection module 64 in GSS 22 may access VIP URL Configuration store 60 and run a selection algorithm to determine a suitable VIP. For example, if only one VIP address is associated with the requested URL, GSS 22 may provide that VIP address as selected VIP address 40. If the application is available at multiple datacenters, VIP URL Configuration store 60 may indicate multiple VIP addresses for the requested URL. The selection algorithm may choose a suitable VIP address based on several considerations, including loadbalance, geographical proximity, and/or other intelligent policies and return a suitable VIP address. GSS 22 may subsequently provide selected VIP address 40 to ACE 16.

Forward module 50 in ACE 16 may forward HTTP request 36 to selected VIP address 40. The ACE at selected VIP address 40 may respond appropriately with HTTP response 42, which may be forwarded to the client by forward module 50. In various embodiments, ACE 16 may use processor 54 and memory element 56 to perform the operations described herein. Likewise, GSS 22 may use processor 66 and memory element 68 to perform the operations described herein.

Figure 3:
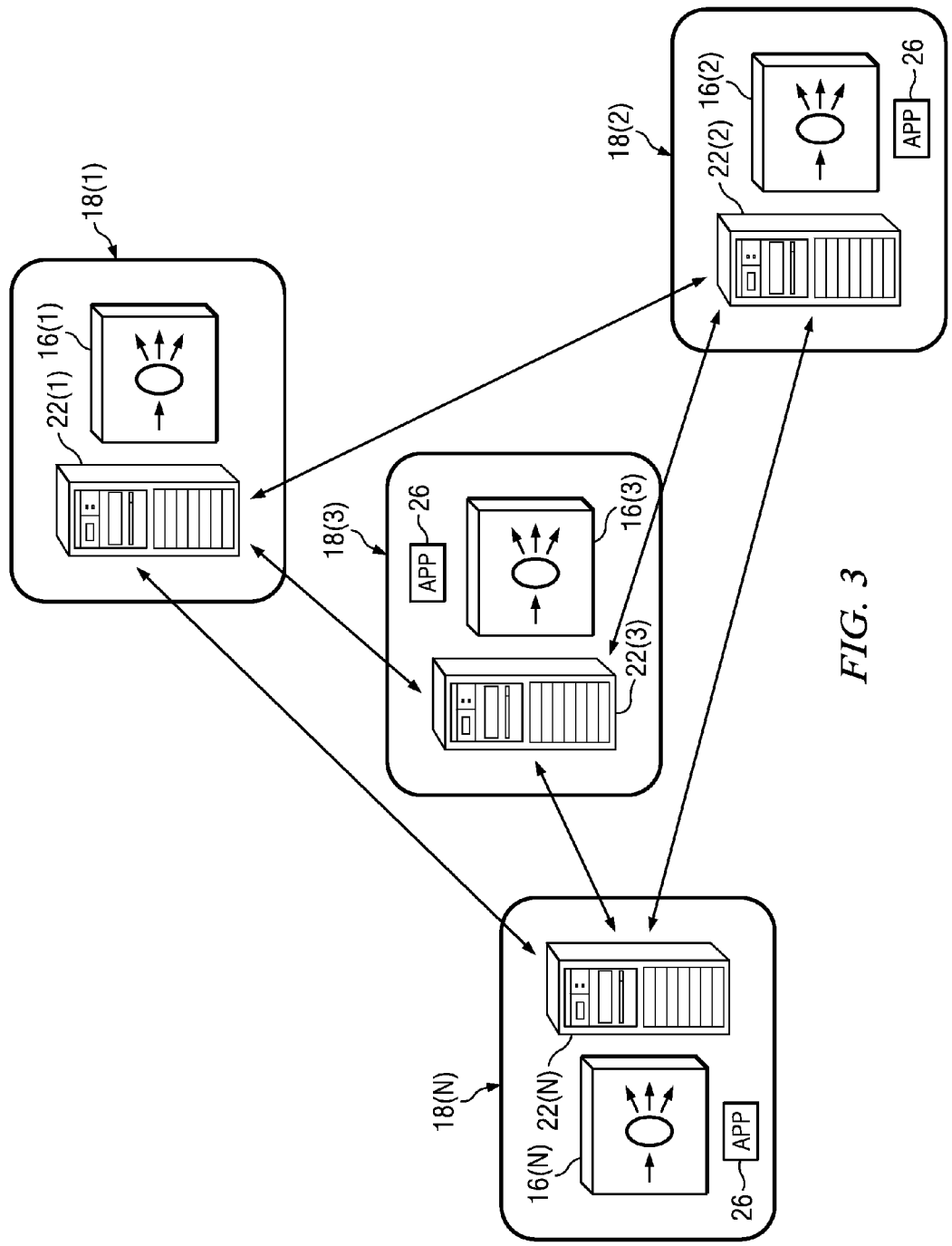
FIG. 3 is a simplified block diagram illustrating another embodiment of the communication system.

Turning to FIG. 3, FIG. 3 is a simplified block diagram illustrating a scenario where application 26 is available at multiple datacenters 16(2)-16(N) in communication system 10. For ease of explanation, assume that datacenter 16(1) does not host application 26. ACEs 16(2)-16(N) may push respective VIP address and URL of application 26 to respective local GSS 22(2)-22(N). GSS 22(2)-22(N) may propagate the information to all other GSS, so that substantially all GSS 22(1)-22(N) may have information about all VIP addresses associated with application 26. If ACE 16(1) receives a request for application 26, and it queries GSS 22(1), GSS 22(1) may respond with a suitable VIP address selected from the aggregated propagated information.

Figures 4, 5:
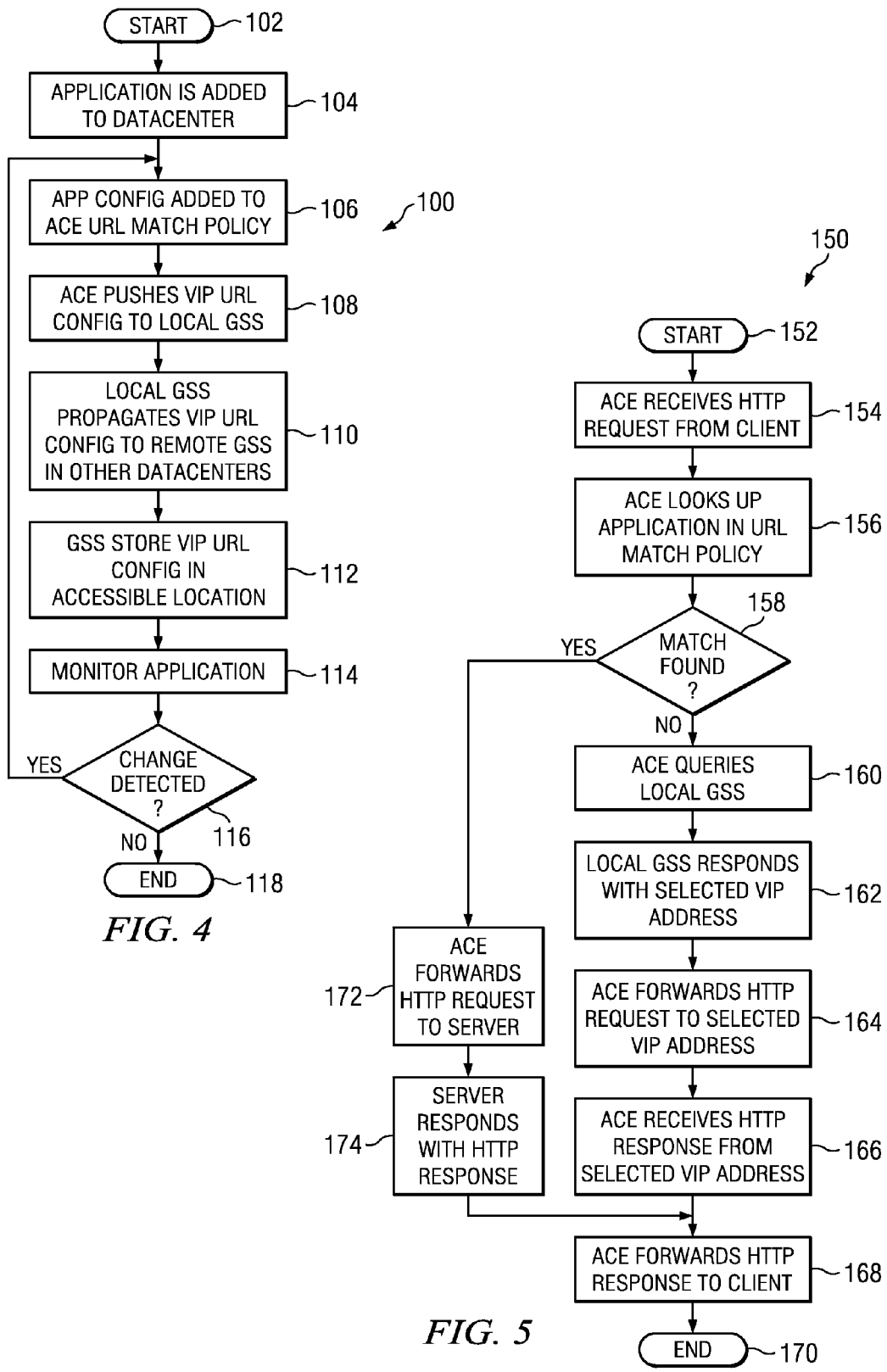
FIG. 4 is a simplified flow diagram illustrating example operations that may be associated with an embodiment of the communication system.
FIG. 5 is a simplified flow diagram illustrating other example operations that may be associated with an embodiment of the communication system.

Turning to FIG. 4, FIG. 4 is a simplified flow diagram illustrating example configuration activities that may be associated with an embodiment of communication system 10. Operations 100 may start at 102, when ACE 16 is turned on. Application 26 may be added to datacenter 18 at 104. At 106, App Config 28 may be added to ACE 16's URL match policy 44. In some embodiments, application 26 may push App Config 28 to ACE 16. In other embodiments, a network administrator may configure URL match policy 44 with application 26's URL. At 108, ACE 16 may push VIP URL Config 30 to local GSS 22. At 110, local GSS 22 may propagate VIP URL Config 30 to remote GSSs in other datacenters. At 112, GSS 22 may store VIP URL Config 30 in an accessible location (e.g., VIP URL Configuration store 60). At 114, ACE 16 may monitor application 26. At 116, a determination may be made whether there are any changes in application 26. If yes, the operations loop back to 106, at which the changes are added to URL match policy 44. If there are no changes to application 26, the process may end at 118.

Turning to FIG. 5, FIG. 5 is a simplified flow diagram illustrating example data flow activities that may be associated with an embodiment of communication system 10. Operations 150 may start at 152, when ACE 16 is activated. At 154, ACE 16 may receive HTTP request 36 for application 26 from client 12. At 156, ACE 16 may look up application 26 in URL match policy 44. At 158 a determination may be made whether a match is found. If a match is not found, ACE 16 may query local GSS 22 at 160. At 162, local GSS 22 may respond with selected VIP address 40. At 164, ACE 16 may forward HTTP request 36 to selected VIP address 40. At 166, ACE 16 may receive HTTP response 42 from selected VIP address 40. At 168, ACE 16 may forward HTTP response 42 (received from appropriate server 24) to client 12. The operations may end at 170. Referring back to 158, if a match is found, ACE 16 may forward HTTP request 36 to the locally available server at 172. The locally available server may respond with HTTP response 42 at 174, and ACE 16 may forward HTTP response 42 to client 12 at 168.

Figure 6:
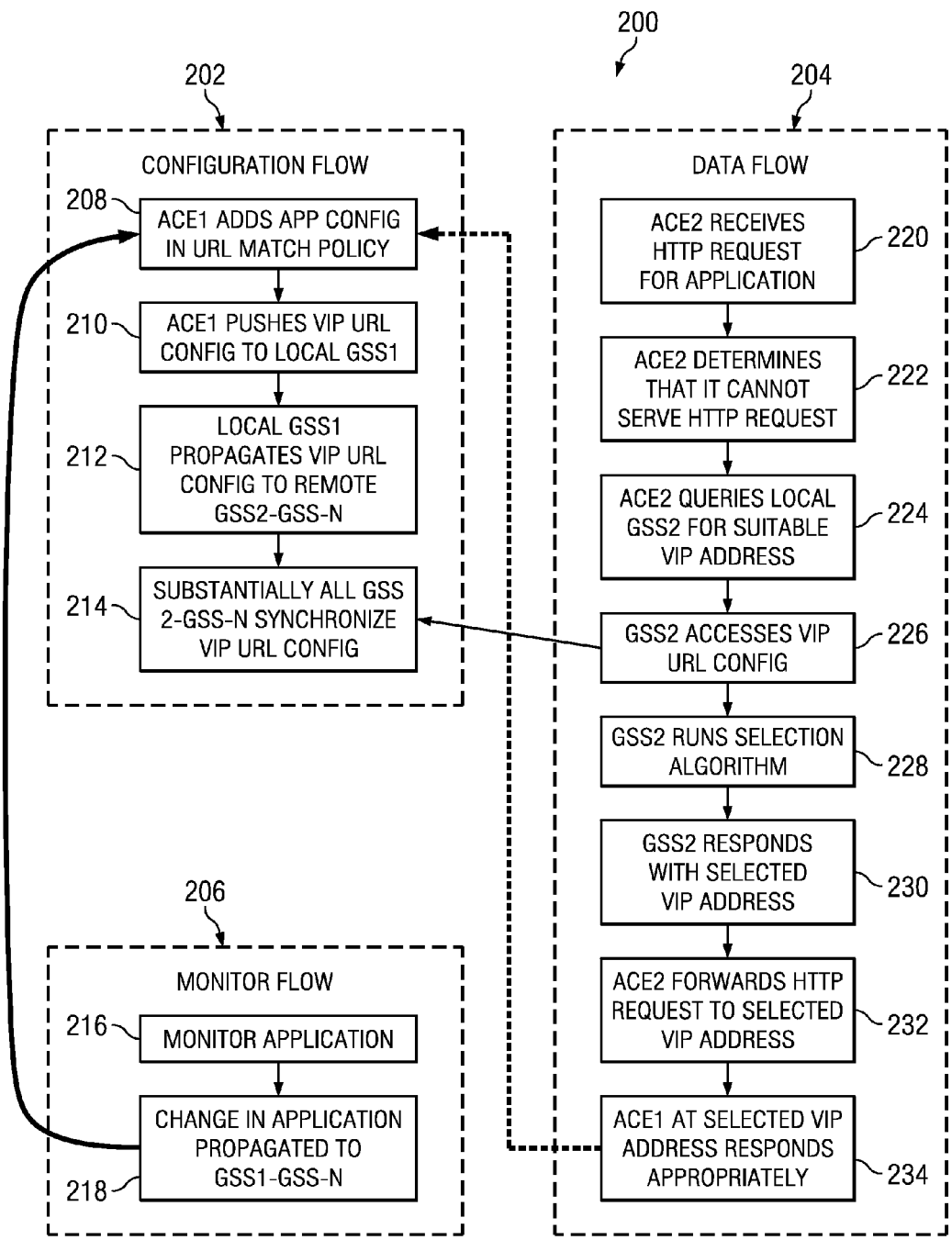
FIG. 6 is a simplified flow diagram illustrating yet other example operations that may be associated with an embodiment of the communication system.

Turning to FIG. 6, FIG. 6 is a simplified flow diagram illustrating example operational steps associated with embodiments of communication system 10. Operations 200 may include a configuration flow 202, a monitor flow 204, and a data flow 206. Configuration flow 202 may include 208, at which ACE 16(1) ("ACE1") in datacenter 18(1) adds App Config 28 in URL match policy 44. At 210, ACE 16(1) may push VIP URL Config 30 to local GSS 22(1) ("GSS1") in datacenter 18(1). Local GSS 22(1) may propagate VIP URL Config 30 to remote GSS 22(2) ("GSS2") to GSS 22(N) ("GSS-N") at 212. At 214, substantially all GSS 22(2)-22(N) may synchronize VIP URL Config 30.

Monitor flow 204 may include 216, at which application 26 may be monitored. At 218, any change in application 26 may be propagated to substantially all GSS 22(1)-22(N). In some embodiments, the changes may be propagated to URL match policy 44, then pushed to respective local GSS (e.g., GSS 22(1)), for example, with the KAL-AP mechanism, and subsequently, the change may be propagated to other GSSs (e.g., GSS 22(2)-22(N)), for example, with the synchronization mechanism. By way of examples, and not as limitations, changes in application 26 can include: application 26 is moved to a different server in the same datacenter; application 26 is moved to a different datacenter; application 26 is brought down for maintenance; servers 24 on which application 26 is available are taken off line; several copies of application 26 are distributed throughout multiple datacenters; etc.

Data flow 204 includes 220, at which ACE 16(2) ("ACE2") at datacenter 18(2) receives HTTP request 36 for application 26. At 222, ACE 16(2) may determine that it cannot serve HTTP request 36 (e.g., because application 26 is down at datacenter 18(2), or application 26 is not available at datacenter 18(2), etc.). At 224, ACE 16(2) may query its local GSS 22(2) for a suitable VIP address. At 226, GSS 22(2) may access VIP URL Config 30 stored during operation 212. At 228, GSS 22(2) may run a selection algorithm to select the suitable VIP address. The selection algorithm may consider load on the different datacenters, geographical proximity to client 14, and intelligent policies, among other factors, to select the suitable VIP address. At 230, GSS 22(2) may respond to ACE 16(2) with selected VIP address 40. At 232, ACE 16(2) may forward HTTP request 36 to selected VIP address 40. At 234, ACE 16(1) may receive HTTP request 36 and look up URL match policy 44 to determine the location of application 26 (see operation 206), and respond appropriately with HTTP response 42.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

In example implementations, at least some portions of the activities outlined herein may be implemented in software in, for example, ACE 16 and GSS 22. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, ACE 16 and GSS 22 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some example embodiments, one or more memory elements can store data used for the operations described herein. This includes the memory element (e.g., memory elements 56 and 68) being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processors 54 and 66) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   pushing, by a hardware network element, a VIP uniform resource locator (URL) Configuration of applications hosted at the first datacenter to a first global site selector (GSS) located at the first datacenter, wherein the VIP URL Configuration is propagated from the first GSS to a plurality of other GSS in a cluster spanning a plurality of datacenters;
   receiving, at the hardware network element, a hypertext transfer protocol (HTTP) request from a client for an application, which is not available at the first datacenter;
   querying the first GSS configured to identify a second datacenter at which the application is available, wherein the second datacenter is identified by a selected virtual Internet Protocol (VIP) address;
   forwarding the HTTP request to the selected VIP address; and
   responding to the client with an HTTP response received from the selected VIP address.

2. The method of claim 1, wherein the first GSS identifies the second datacenter from the VIP URL Configuration, and wherein the VIP URL Configuration includes the selected VIP address corresponding to a URL of the application.

3. The method of claim 2, wherein a change in configuration of the application is reflected in the VIP URL Configuration.

4. The method of claim 2, wherein:
   the application is available at a plurality of datacenters,
   the VIP URL configuration indicates a plurality of VIP addresses corresponding to the URL of the application, and
   the first GSS selects the selected VIP address from the plurality of VIP addresses based on at least: load distribution among substantially all GSSs in the plurality of datacenters, geographical proximity to the client of each datacenter in the plurality of datacenters, or policies.

5. The method of claim 1, further comprising:
   configuring a URL of the application on a second GSS in the second datacenter; and
   propagating the URL and the selected VIP address to the first GSS.

6. The method of claim 5, wherein the configuring the URL of the application comprises pushing the selected VIP address and the URL of the application from an application control engine (ACE) in the second datacenter to the second GSS.

7. The method of claim 6, wherein the URL of the application is added to a URL match policy in the ACE.

8. The method of claim 7, wherein the URL of the application is added to the URL match policy when the application is added to the second datacenter.

9. The method of claim 1, wherein the HTTP request includes a URL of the application, wherein the URL specifies a domain name and a path.

10. The method of claim 1, further comprising:
    identifying a URL match policy to determine whether the application is available at the first datacenter.

11. Logic encoded in non-transitory media that includes instructions for execution and when executed by a processor, is operable to perform operations comprising:
    pushing, by a hardware network element, a VIP uniform resource locator (URL) Configuration of applications hosted at the first datacenter to a first global site selector (GSS) located at the first datacenter, wherein the VIP URL Configuration is propagated from the first GSS to a plurality of other GSS in a cluster spanning a plurality of datacenters;
    receiving, at the hardware network element, a hypertext transfer protocol (HTTP) request from a client for an application, which is not available at the first datacenter;
    querying the first GSS configured to identify a second datacenter at which the application is available, wherein the second datacenter is identified by a selected virtual Internet Protocol (VIP) address;
    forwarding the HTTP request to the selected VIP address; and
    responding to the client with an HTTP response received from the selected VIP address.

12. The logic of claim 11, wherein the first GSS identifies the second datacenter from a VIP URL Configuration, and wherein the VIP URL Configuration includes the selected VIP address corresponding to a URL of the application.

13. The logic of claim 12, wherein:
    the application is available at a plurality of datacenters,
    the VIP URL configuration indicates a plurality of VIP addresses corresponding to the URL of the application, and
    the first GSS selects the selected VIP address from the plurality of VIP addresses based on at least: load distribution among substantially all GSSs in the plurality of datacenters, geographical proximity to the client of each datacenter in the plurality of datacenters, or policies.

14. The logic of claim 11, the operations further comprising:
configuring a URL of the application on a second GSS in the second datacenter; and
propagating the URL and the selected VIP address to the first GSS.

15. The logic of claim 14, wherein the configuring the URL of the application includes pushing the selected VIP address and the URL of the application from an ACE in the second datacenter to the second GSS.

16. An apparatus, comprising:
a memory element for storing data; and
a hardware processor that executes instructions associated with the data, wherein the processor and the memory element cooperate such that the apparatus is configured to:
pushing, by the apparatus, a VIP uniform resource locator (URL) Configuration of applications hosted at the first datacenter to a first global site selector (GSS) located at the first datacenter, wherein the VIP URL Configuration is propagated from the first GSS to a plurality of other GSS in a cluster spanning a plurality of datacenters;
receiving, at the apparatus, a hypertext transfer protocol (HTTP) request from a client for an application, which is not available at the first datacenter;
querying the first GSS configured to identify a second datacenter at which the application is available, wherein the second datacenter is identified by a selected virtual Internet Protocol (VIP) address;
forward the HTTP request to the selected VIP address; and
respond to the client with an HTTP response received from the selected VIP address.

17. The apparatus of claim 16, wherein the first GSS identifies the second datacenter from a VIP URL Configuration, wherein the VIP URL Configuration includes the selected VIP address corresponding to a URL of the application.

18. The apparatus of claim 17, wherein:
the application is available at a plurality of datacenters,
the VIP URL configuration indicates a plurality of VIP addresses corresponding to the URL of the application, and
the first GSS selects the selected VIP address from the plurality of VIP addresses based on at least: load distribution among substantially all GSSs in the plurality of datacenters, geographical proximity to the client of each datacenter in the plurality of datacenters, or policies.

19. The apparatus of claim 16, wherein the apart us is further configured to:
configure a URL of the application on a second GSS in the second datacenter; and
propagate the URL and the selected VIP address to the first GSS.

20. The apparatus of claim 19, wherein the configuring the URL of the application includes pushing the selected VIP address and the URL of the application from an ACE in the second datacenter to the second GSS.

* * * * *